United States Patent [19]

Simmons

[11] 3,894,465
[45] July 15, 1975

[54] MOVABLE CHORD FINDER

[76] Inventor: Louis E. Simmons, 14356 Poway Rd., Poway, Calif. 92064

[22] Filed: Nov. 8, 1973

[21] Appl. No.: 414,161

[52] U.S. Cl. .................................................. 84/485
[51] Int. Cl. .......................................... G10b 15/00
[58] Field of Search .......... 84/485, 473; 235/70, 89

[56] References Cited
UNITED STATES PATENTS

| | | | |
|---|---|---|---|
| 1,300,193 | 4/1919 | Raff | 84/485 |
| 1,556,147 | 10/1925 | Johnson et al. | 84/485 |
| 2,001,191 | 5/1935 | Golden | 84/485 |
| 3,338,126 | 8/1967 | Wiley et al. | 84/485 |
| 3,554,074 | 1/1971 | Rickey | 85/485 |
| 3,788,947 | 7/1973 | Freiheit | 84/485 |

Primary Examiner—Lawrence R. Franklin

[57] ABSTRACT

A movable simulated fingerboard for fretted musical instruments upon which are various markings as a guide for finger placement on a real instrument. Selection of one chord automatically positions simulated board and markings as a guide for playing related chords.

7 Claims, 4 Drawing Figures

MOVABLE CHORD FINDER

BACKGROUND OF THE INVENTION

1. Field of the Invention

The subject matter of the claimed invention is broadly that of devices which assist persons to understand and play musical instruments having strings and frets on their fingerboards such as guitars, banjos, mandolins and ukuleles. For persons learning to play such instruments it is of great benefit to have a simple and easy to operate means for showing finger placement on the strings to produce rhythm chords. Such means would, ideally, show all other finger placements for the most pertinent related chords automatically upon location of one selected positioning. In such a manner a student, whether beginning or advanced, could quickly learn the relationship of various chords, and concurrently, learn finger placement to play those chords.

2. Description of the Prior Art

Other innovators have provided some mechanical means to assist persons learning to play the described instruments. An examination of most pertinent prior art discloses, by enlarge relatively complicated means for assisting a teacher in teaching music that could be applied to the subject instruments. For example, U.S. Pat. No. 3,712,167 does show finger positions, however, chords must be pre-determined. Each string is represented by a separate slide portion. Apparently for advanced students only (it's too complicated for beginners) this patent helps teach music; it does not directly give specific finger positions for a designated instrument. Similarly, in U.S. Pat. No. 3,668,967 a device too intricate for the beginning student is shown; the person using the device must know, in advance, which notes make up the chord to be played. Without being applicable to a specific instrument, it has to do with chords only. Again, U.S. Pat. No. 2,814,231 is a complicated device for guitars only. Difficulty would be encountered in lining up the peep holes. With complications due to its twelve different slides and four moving parts it appears very difficult for the average student to understand. The disclosure in U.S. Pat. No. 1,556,147 again shows the requirement of knowing the chord to be played in advance of using the device. It has several moving parts and its difficulty of use would limit its appeal to students. Other less pertinent patents are either devices to be applied directly to the fingerboard or devices which could not be used in the manner and specific purpose of my invention.

SUMMARY

By providing a simulated fretted fingerboard of a particular musical instrument and a body portion in which it is slidably mounted, I have avoided teaching music that could be applied to an instrument, as the prior art has done, and in place and instead, I have provided a device which, in effect, teaches a particular instrument. In this manner, for the first time, I have made a simple, easily understood, device which is sufficiently clear and instructive for even the beginning student. On the transparent windows in the body portion, through which the slidable simulated fingerboard may be seen, I have placed markings to designate proper finger positions on a corresponding real fingerboard. The windows and markings are so arranged that particular placement of the simulated fingerboard in respect to one window will automatically align with markings in other windows to show proper finger placement for playing related chords.

DESCRIPTION OF PREFERRED EMBODIMENT

Figure 2:
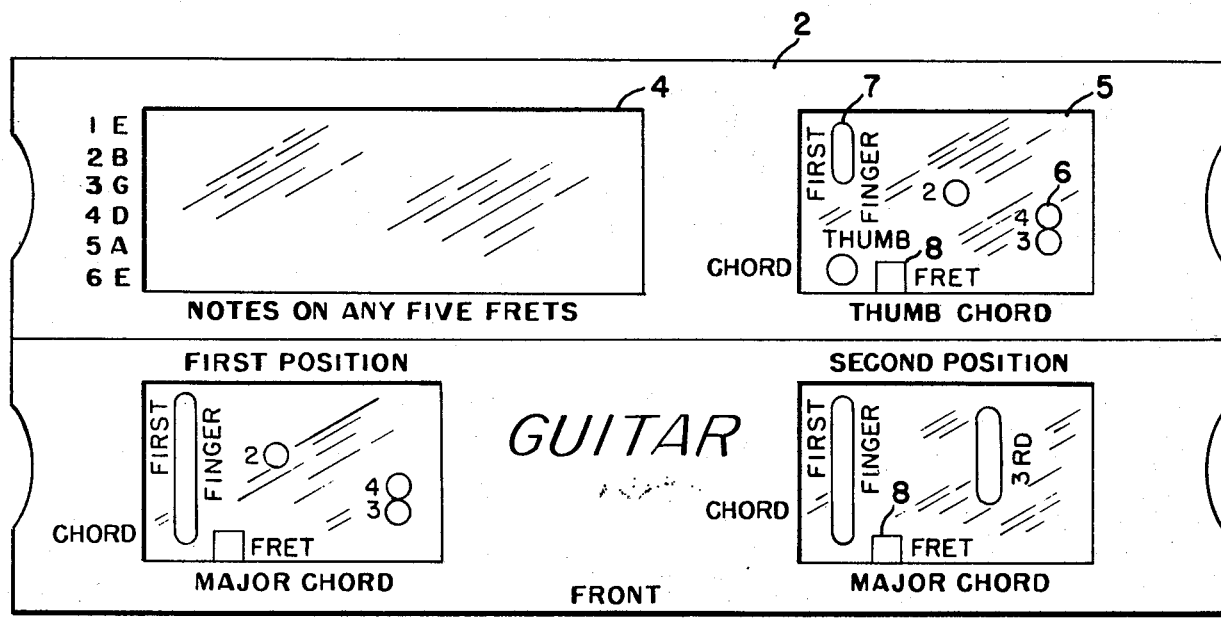
FIG. 2 is a top plan view of one side of the body portion thereof.
Figure 4:
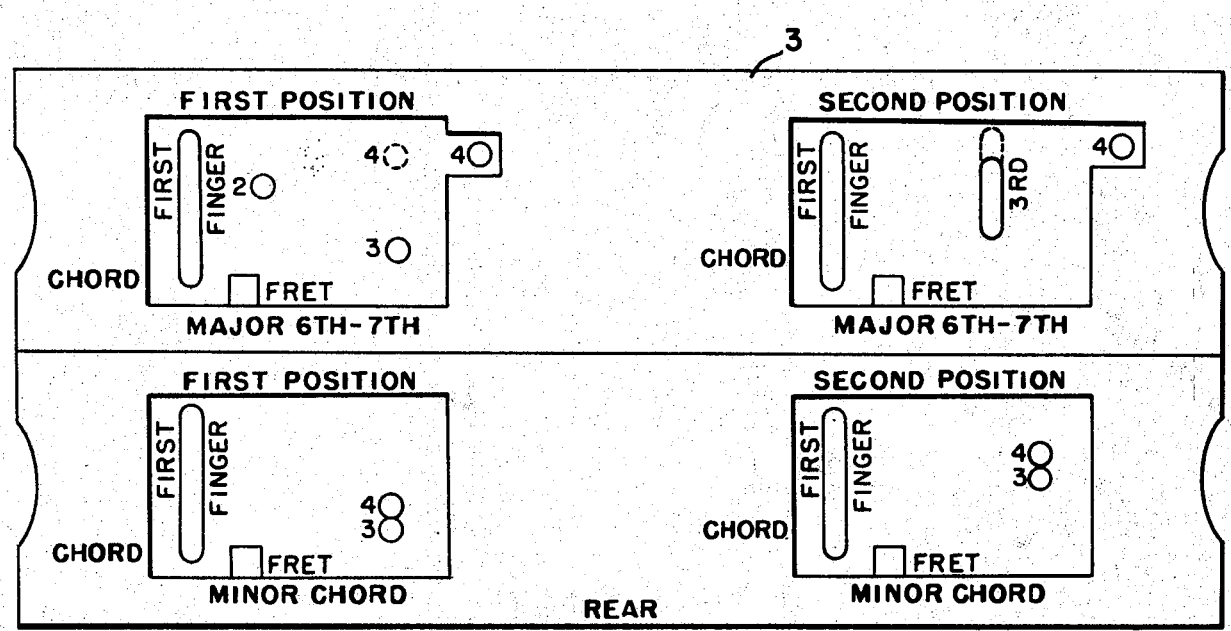
FIG. 4 is a top plan view of another side of the body portion, being the reverse side of that shown in FIG. 2.

Referring to the drawing forming a part hereof wherein like numerals designate like parts throughout, the numeral 1 represents a body portion formed of plastic or other suitable substance. It is substantially rectangular in shape and comprises two integrated flat sections, a top or front section 2 shown in FIG. 2 and a bottom or rear section 3 shown in FIG. 4. Each section has window means, i.e., transparent portions, extending through the respective flat sections. All window means preferably have clear plastic on their entire surface.

Window means may or may not have markings thereon. As can be seen as item 4 of FIG. 2 I prefer to have one window without markings in combination with at least one other window means, item 5, with markings. Markings are, of course, positioned at specified and meaningful places on the transparent plastic. As will be obvious to skilled persons it is the space relationship of the markings, one to another, and to a simulated fret, which suggests the proper finger placement for desired musical sounds. For convenience I have used small circles, typified by item 6 to suggest individual finger placement on one string and an elongated configuration 7 to suggest finger coverage of more than one string. For convenience I have delineated distinguishable windows, typified by item 8, throughwhich numerical data, such as that representing the number of particular fret, may appear. As can be seen in the drawings, various words, phrases and numerals may appear on the body portion to clarify and simplify the use of the device.

Figure 1:
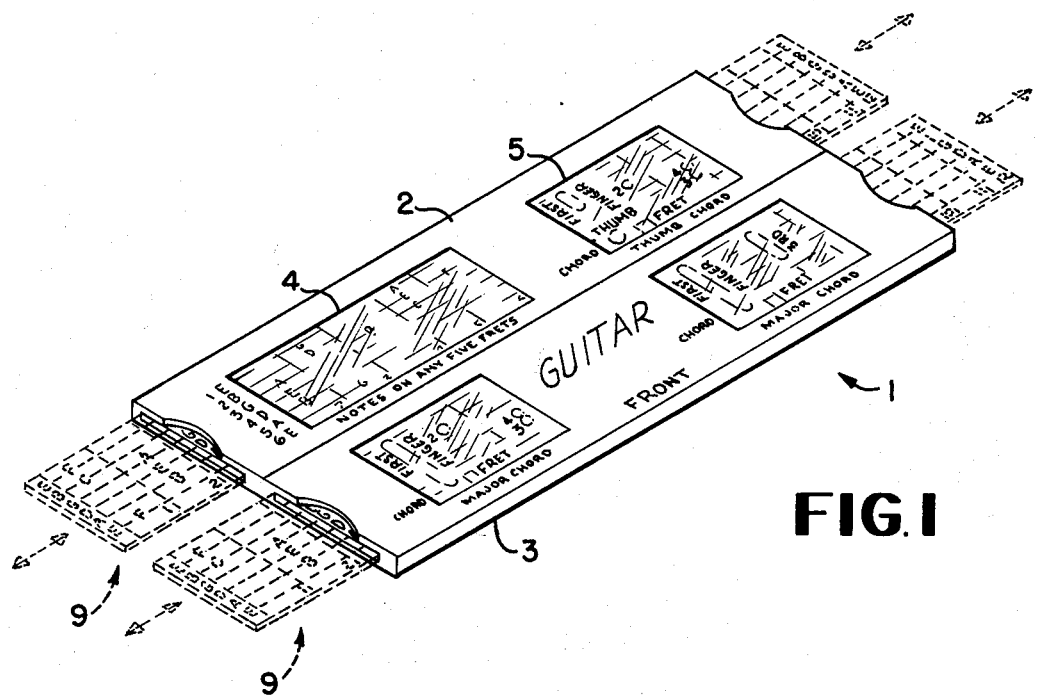
FIG. 1 is a perspective view from one side of the preferred form of my invention.
Figure 3:
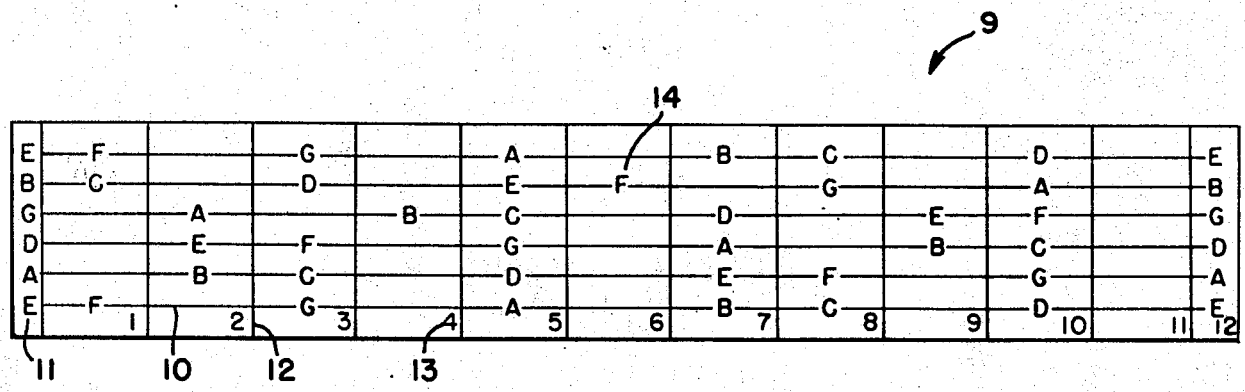
FIG. 3 is a top plan view of a simulated fingerboard portion of my device.

An important feature of my invention is a simulated fingerboard means 9, shown in FIG. 3. One or more, preferably two, of such items are slidably mounted in the body portion, not unlike the action of the well known slide rule. They may be manually moved in the direction of the arrows of FIG. 1. As is best illustrated in FIG. 3, I provide markings on the simulated fingerboard whereby it resembles the actual fingerboard of the instrument to be played. I prefer to use straight lines, for example item 10, to suggest strings of the real instrument. The number of lines and letter symbols thereon, such as item 11, are the same as that characteristic of the real instrument to be played. Also, I prefer to have a series of equally spaced parallel lines, typified by item 12, to represent the frets of the instrument. They are preferably numbered (see item 13 as typical) in order of common number identity of frets on the real instrument. Also, other meaningful data, such as item 14, may be printed on the simulated board.

For example, I have illustrated markings and parts of use in learning to play a guitar. By changing indicia to correspond to the particular real instrument, my invention is equally useful as an aid while learning to play a mandolin, ukulele or plectrum banjo.

Without describing and limiting my improvement to particular placements and positions, it will be obvious to skilled persons that by aligning certain indicia on the board means 9 with certain indicia on body portion 1 will, in and of itself, provide the student with related notes and chord information in several windows.

I claim:

1. Apparatus to teach rhythm chords to be played on stringed instruments having a plurality of frets and strings on a fingerboard, which strings are strummed to produce sound, comprising a body portion having two spaced slots within said body portion extending longitudinally thereof and a flat simulated fingerboard inserted in each slot and slidable therein; a plurality of window means spacedly arranged on the front surface of said body portion and on the back surface of said body portion, said window means being positioned in pairs in the upper and lower halves of said front and back surfaces, said pair of window means in the upper halves of said front and back surfaces communicating with the upper one of said slots, said pair of window means in said lower halves of said front and back surfaces communicating with the lower one of said slots, each fingerboard having on the front and back surfaces thereof a plurality of longitudinal lines simulating the number of strings on a particular stringed instrument and a plurality of lines transverse to the simulated string lines representing the number of frets on said particular instrument, the simulated string lines being identified by the actual notes of the respective strings on the actual instrument, the fret representation lines being identified by the numbers corresponding to the numbers of the respective frets on said instrument, selected window means on one of said surfaces of said body portion bearing indicia varyingly placed on said window means with reference to said simulated strings and said represented frets to indicate two or more positions of the fingers on the fingerboard of said instrument to produce the same rhythm chord.

2. The apparatus according to claim 1 wherein one of said rhythm chords is a minor chord.

3. The apparatus according to claim 2 wherein the simulated fingerboard in combination with one of said window means displays the notes that can be played on each of said strings of said instrument within any group of five successively numbered frets when said strings are depressed in the well known manner between said frets.

4. The apparatus according to claim 3 wherein said body portion at the left hand side of said one window means carrys the same indicia as to string number and string note as is displayed on the simulated fingerboard slidable member.

5. The apparatus according to claim 2 wherein said simulated fingerboards carry indicia indicating the note which can be produced by depressing one or more of said strings on the fingerboard of said instrument between the frets displayed on said simulated fingerboard of said apparatus.

6. The apparatus according to claim 1 wherein one of said rhythm chords is a major chord.

7. The apparatus according to claim 6 wherein the window means on the back surface of said body portion carry indicia which show the finger positions to be used on the strings of the fingerboard of said instrument when related to the indicia on said simulated fingerboard of said apparatus to produce chords other than major chords.

* * * * *